W. G. FAY.
GUARD PLATE AND BEARING PAD FOR EYEGLASS MOUNTS.
APPLICATION FILED JUNE 22, 1908.
923,826. Patented June 8, 1909.
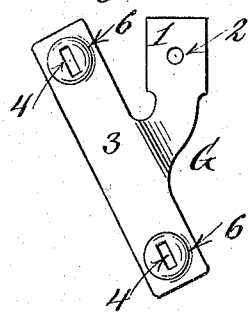 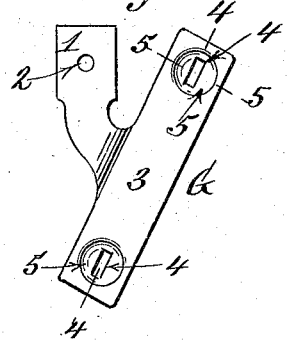 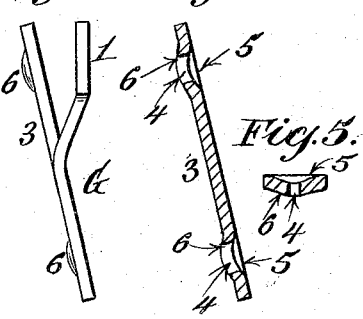
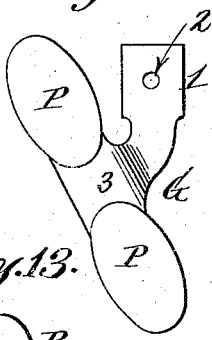 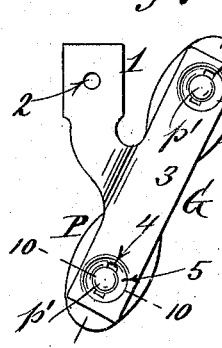 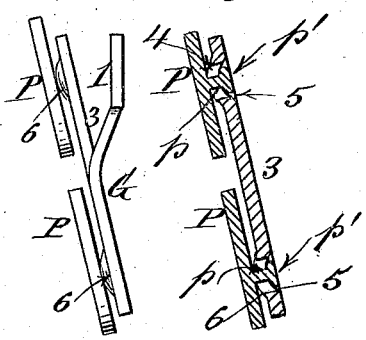
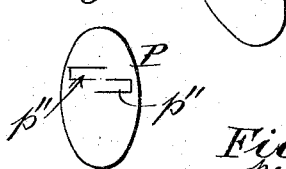  
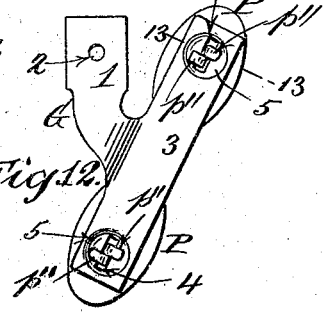
Witnesses:
O. W. Gardner
Bm Bng.
Inventor:
Waldo G. Fay
By his Attorney
Geo. Wm Miatt

UNITED STATES PATENT OFFICE.

WALDO G. FAY, OF PELHAM, NEW YORK.

GUARD-PLATE AND BEARING-PAD FOR EYEGLASS-MOUNTS.

No. 923,826.　　　　Specification of Letters Patent.　　　Patented June 8, 1909.

Application filed June 22, 1908. Serial No. 439,665.

*To all whom it may concern:*

Be it known that I, WALDO G. FAY, a citizen of the United States, residing in Pelham, Westchester county, and State of New York, have invented certain new and useful Improvements in Guard-Plates and Bearing-Pads for Eyeglass-Mounts, of which the following is a specification.

My improvements relate to guard plates and bearing pads used in eye glass mounts,—the guard plates to which the bearing pads are connected being secured to the lens posts as heretofore.

The object of my invention is primarily to afford a bearing pad which is free to adapt itself independently within certain prescribed limits, both longitudinally and laterally upon, and as related to, the guard plate on which it is mounted, in such manner that said bearing pad may conform readily and perfectly to the curvature of surface to which it may be applied (as the nose of the user) whether said surface be concave or convex or inclined laterally with relation to the guard plate; and secondarily to afford twin bearing pads of such character on each guard plate, all as hereinafter described and claimed specifically.

In the accompanying drawings, which show the parts enlarged for convenience of illustration, Figures 1 and 2, are respectively elevations of opposite sides of what may be designated as the left hand guard plate; Fig. 3, an edge view of the same; Fig. 4, a longitudinal section upon plane of line 4—4— Fig. 2; Fig. 5, a transverse section upon plane of line 5—5— Fig. 2; Figs. 6 and 7, are views similar to Figs. 1 and 2, with the bearing pads attached; Fig. 8, is an edge view of Fig. 7; Fig. 9, a section upon plane of line 9—9— Fig. 7; Fig. 10, is a section upon plane of line 10—10— Fig. 7; Figs. 11 and 12, are elevations similar to Figs. 6 and 7, showing the use of a special form of bearing pad; Fig. 13, is a view of the inner side of such a bearing pad; and Fig. 14, a section upon plane of line 14—14— Fig. 12.

The guard plate G shown in the drawings is designed for the left hand lens post, of a pair of eye glasses to which post the said guard plate G is secured by a screw passing through the perforation 2 of the shank 1, or in any well known or suitable manner. The guard plates for a pair of eye glasses are made in rights and lefts, but are otherwise the same in structure, consisting of the perforated shank 1, and the elongated bearing plate 3, upon which the bearing pads P are mounted.

The elongated bearing plate 3 is formed with longitudinal slots 4 near each extremity which are preferably in the same longitudinal plane. The portions of the plate 3 adjoining each of these slots 4 are bent to form a concavity 5, on one side of the said plate 3, and a convex surface 6 on the other side thereof.

Each bearing pad P is preferably formed of one piece, with a rearwardly projecting stud $p$, adapted to project through one of the elongated slots 4 in the plate 3, and to have its end upset or peaned over to form a head $p'$, as in Figs. 7 to 10 inclusive; or when the pad P is made of suitable material, studs $p$, may be cut and bent out of the body of the pad, and the ends thereof bent over to form flanges or heads $p''$, as in Figs. 12 to 14 inclusive. In either case the heads $p'$, or $p''$, lock the bearing pads P loosely in position upon the plates 3, but do not prevent the said bearing pads P adapting themselves both laterally and longitudinally to any inclination or curvature of surface to which the pads may be applied in use.

The requisite lateral play of the bearing pads is necessarily but slight, so that the difference between the width of the slots 4, and the thickness of the studs $p$, is sufficient to afford all the looseness that is desirable in this respect; but a much greater degree of longitudinal play and flexibility is desirable in so far as the bearing pads P are concerned and this is provided for by the longitudinal slots 4 in the plates 3. In this connection the curvature of the portions of the plate 3 adjoining the longitudinal slots 4, is important in that it augments the scope of inclination and play afforded the bearing pad. It will be noted that these twin pads P, articulate independently upon each guard plate G, are in alinement with each other, and are the only contacts or bearings employed by me, my object being purposely to avoid and dispense with rigid unyielding bearing surfaces such as heretofore used.

I am aware that articulated bearings have heretofore been used in conjunction with rigid bearings, and I do not seek to cover an articulated bearing broadly, but only my special construction and arrangement of independently articulated twin bearing pads, as herein set forth, whereby the mount is adapted not only to the longitudinal curvature of the opposed surface of the nose of the user, whether convex or concave, or both, but also to lateral curvature as well, and in this connection it is important to note that this lateral adaptability of the bearing pad acts constantly to retain the glasses against accidental displacement or forward slip upon the nose of the user, because any lateral movement causes the bearing pad to tilt over so that its edge will press or dig into the adjoining flesh of the nose, and thereby prevent slip and displacement.

What I claim as my invention and desire to secure by Letters Patent is,

1. A guard plate for eye glass mounts consisting of a shank and an elongated bearing plate formed with an elongated slot near each extremity, and bearing pads formed with rearwardly projecting shanks projecting through said elongated slots in the bearing plate said shanks being of less diameter than the width of the slots and being headed to prevent their withdrawal therefrom, whereby the bearing pads are rendered capable of movement longitudinally upon the bearing plate and also are capable of lateral play thereon, for the purpose described.

2. A guard for eye glass mounts consisting of a shank and an elongated bearing plate formed with portions which are concave on one side and convex on the other, said portions of the bearing plate being formed with elongated slots, and bearing pads formed with rearwardly projecting shanks projecting through said elongated slots in the bearing plate said shanks being of less diameter than the width of the slots and being headed to prevent their withdrawal therefrom, whereby the bearing pads are rendered capable of movement longitudinally upon the bearing plate and also are capable of lateral play thereon, for the purpose described.

3. The combination with a guard plate of the character designated formed with a portion concave on one side and convex on the other, said portion being formed with an elongated slot, of a one piece bearing pad formed with shank passing through said elongated slot said shank being of less diameter than the width of the slots and being headed to prevent its withdrawal therefrom, whereby the bearing pad is rendered capable of movement longitudinally within the slot and is also capable of lateral play upon the guard plate, for the purpose described.

WALDO G. FAY.

Witnesses:
D. W. GARDNER,
GEO. WM. MIATT.